US012551431B2

United States Patent
Jamin et al.

(10) Patent No.: US 12,551,431 B2
(45) Date of Patent: *Feb. 17, 2026

(54) PEEL-OFF FILM-FORMING COSMETIC COMPOSITION

(71) Applicants: CHANEL PARFUMS BEAUTE, Neuilly sur Seine (FR); ROQUETTE FRERES, Lestrem (FR)

(72) Inventors: Julie Jamin, Pantin (FR); Sarah Sebban Znaty, Pantin (FR); Flavie Maire-Amiot, Pantin (FR); Stéphane Bureau, Pantin (FR)

(73) Assignees: CHANEL PARFUMS BEAUTE, Neuilly sur Seine (FR); ROQUETTE FRERES, Lestrem (FR)

( * ) Notice: Subject to any disclaimer, the term of this patent is extended or adjusted under 35 U.S.C. 154(b) by 911 days.

This patent is subject to a terminal disclaimer.

(21) Appl. No.: 17/599,715

(22) PCT Filed: Mar. 27, 2020

(86) PCT No.: PCT/EP2020/058671
§ 371 (c)(1),
(2) Date: Sep. 29, 2021

(87) PCT Pub. No.: WO2020/201067
PCT Pub. Date: Oct. 8, 2020

(65) Prior Publication Data
US 2022/0054400 A1    Feb. 24, 2022

(30) Foreign Application Priority Data

Mar. 29, 2019  (FR) ..................................... 19 03335

(51) Int. Cl.
| | |
|---|---|
| *A61K 8/9789* | (2017.01) |
| *A61K 8/02* | (2006.01) |
| *A61K 8/34* | (2006.01) |
| *A61K 8/60* | (2006.01) |
| *A61K 8/73* | (2006.01) |
| *A61Q 1/10* | (2006.01) |
| *A61Q 19/00* | (2006.01) |

(52) U.S. Cl.
CPC .......... *A61K 8/9789* (2017.08); *A61K 8/0212* (2013.01); *A61K 8/34* (2013.01); *A61K 8/345* (2013.01); *A61K 8/608* (2013.01); *A61K 8/73* (2013.01); *A61K 8/732* (2013.01); *A61Q 1/10* (2013.01); *A61Q 19/00* (2013.01); *A61K 2800/43* (2013.01); *A61K 2800/95* (2013.01)

(58) Field of Classification Search
None
See application file for complete search history.

(56) References Cited

U.S. PATENT DOCUMENTS

| | | | |
|---|---|---|---|
| 6,602,513 B2 | 8/2003 | Mochizuki et al. | |
| 11,376,204 B2 * | 7/2022 | Thomas | ................ A61K 8/463 |
| 2015/0132247 A1 | 5/2015 | Gombart et al. | |

FOREIGN PATENT DOCUMENTS

| | | | | |
|---|---|---|---|---|
| CA | 2621263 A1 * | 3/2007 | ............. | A23L 33/10 |
| CN | 108434070 A | 8/2018 | | |
| EP | 0970681 A | 1/2000 | | |
| EP | 2937082 A1 * | 10/2015 | ............. | A61K 47/38 |
| JP | 2015516408 A | 6/2015 | | |
| JP | 6317252 B2 * | 4/2018 | ............. | A61K 8/361 |
| KR | 1020110007508 A | 1/2011 | | |
| KR | 1020130045724 A | 5/2013 | | |
| KR | 1020160131628 A | 11/2016 | | |
| WO | 2014/155015 A1 | 10/2014 | | |
| WO | WO-2018114548 A1 * | 6/2018 | ............... | A61K 8/29 |

OTHER PUBLICATIONS

International Search Report issued on Apr. 28, 2020 in corresponding International Application No. PCT/EP2020/058671; 4 pages.

* cited by examiner

*Primary Examiner* — Melissa S Mercier
(74) *Attorney, Agent, or Firm* — Maier & Maier, PLLC

(57) ABSTRACT

A film-forming cosmetic composition including, in an aqueous continuous phase, at least one legume starch having an amylose content greater than or equal to 30%, at least two plasticisers selected from polyols and water, it being understood that the polyols are present in a content ranging from 8 to 25% by weight, preferably from 10 to 20% by weight, relative to the total weight of the composition. Also, the use of such a composition for forming, on keratin materials, a peel-off film.

37 Claims, No Drawings

PEEL-OFF FILM-FORMING COSMETIC COMPOSITION

The present invention relates to a film-forming cosmetic composition comprising, in an aqueous continuous phase, at least one legume starch having an amylose content greater than or equal to 30%, at least two plasticisers selected from polyols and water. The invention also relates to the use of such a composition for forming, on keratin materials, a peel-off film.

FIELD

The film-forming compositions are intended to be applied, with or without an applicator, to tissues such as the skin, skin structures (the nails or the hair), the mucous membranes so as to form a homogeneous film on these tissues. They are generally fluid on application and conventionally contain a film-forming polymer dissolved in a volatile solvent, typically water or an alcohol. Evaporation of the solvent allows the formation of a solid protective film during the drying of the composition.

The film-forming compositions must have a controlled texture, sufficiently fluid to be able to be applied to the desired area, regardless of its size, and to form a uniform film thereon, but also thick enough to remain on the area of application during drying time without flowing, to form, after drying, a film having an appropriate thickness.

BACKGROUND

In the field of skin care, products of the beauty mask type are well known in the cosmetics field. They are in particular in the form of a gel, an emulsion or a paste. There are masks that can be removed by peeling, which are aqueous film-forming compositions based on polyvinyl alcohol. The peel-off masks dry, after application to the face, to give a film which is removed by peeling off. During the drying time, the occlusive effect of the mask allows the stratum corneum to moisten and soften, which can promote the penetration of active ingredients when they are present in the composition. In addition, these masks, when they are removed by peeling, provide a "peeling", in particular removing the dead cells from the surface stratum corneum. They can also eliminate comedones and blackheads.

However, the quality of the peel of these masks is often disappointing, the uniformity and strength of the film formed being generally insufficient, leading to tearing of the film when it is peeled off. As a result, the film must be removed in several stages.

In the field of make-up, the peel-off film-forming compositions can be of playful interest and/or to facilitate make-up removal. They are, for example, developed in the field of nail varnishes.

Peel-off compositions today use synthetic polymers such as polyvinylpyrrolidone (PVP) or polyvinyl acetate (PVA). However, consumers are increasingly looking for cosmetic products composed mainly of natural ingredients or of natural origin, with the minimum of chemical modifications. The elimination of synthetic functional ingredients, or their substitution by ingredients of natural origin, constitutes an important axis for the development of new cosmetic products. However, the introduction of these new natural ingredients or of natural origin, may be accompanied by a degradation of the properties of the cosmetic product, in terms of its appearance, its application or its cosmetic properties. These insufficient or degraded cosmetic properties are detrimental to the image of the product.

Therefore, there remains a need for a peel-off cosmetic composition using natural ingredients or of natural origin, capable of forming on keratin materials a continuous, homogeneous, flexible, comfortable film of sufficient thickness and long-lasting, allowing removal by peeling.

SUMMARY

The Applicant has unexpectedly discovered that by combining a very specific legume starch with a plasticiser system of a particular nature, namely comprising at least two polyols, it was possible to produce film-forming cosmetic compositions allowing to form, on keratin materials, a continuous, homogeneous, comfortable film having an acceptable drying time and sufficient breaking strength to be able to be removed by peeling. Complete removal of the composition can be done with water. For a treatment mask, it is estimated that a drying time of less than 20 minutes, preferably between 5 and 15 minutes, is acceptable. For an eye shadow, it is estimated that a drying time of less than 10 minutes, preferably less than 5 minutes is acceptable.

An object of the invention is thus, according to a first aspect, a film-forming cosmetic composition comprising, in an aqueous continuous phase:
- at least one legume starch having an amylose content greater than or equal to 30%, preferably between 30% and 75%,
- at least two plasticisers selected from polyols,
- water.

it being understood that the polyols are present in a content ranging from 8 to 25% by weight, preferably from 10 to 20% by weight, relative to the total weight of the composition.

An object of the invention is also, according to a second aspect, a method for preparing such a composition, comprising:
- mixing plasticisers with water, and optionally with emulsifying and/or film-forming agents,
- adding starch with stirring until a gel forms
- optionally adding a gelling agent,
- optionally adding the colouring agent
- optionally adjusting the pH,
- optionally adding alcohol.

A further object of the invention, according to a third aspect, is a make-up or caring method for keratin materials, in particular the skin, eyelashes, eyebrows or lips, consisting in applying to said keratin materials, in particular the skin, the eyelashes, the eyebrows or the lips, such a film-forming cosmetic composition.

Finally, the object of the invention is the cosmetic use of a composition as described above to form, on keratin materials, a peel-off film.

DETAILED DESCRIPTION

Galenic

The composition according to the invention has an aqueous continuous phase. Preferably, it is in the form of an aqueous gel.

Legume Starch

The composition according to the invention comprises at least one legume starch having an amylose content of greater than or equal to 30%, preferably between 30% and 75%.

In particular, the amylose content is comprised within a range from 30% to 75%, preferably from 30% to 45%, and more preferably from 35% to 42%. The percentages of amylose are expressed by dry weight, relative to the dry weight of starch, and determined before any subsequent treatment such as hydrolysis and/or alkylation of said starch.

Legume starch also has a Brookfield viscosity in aqueous dispersion at 25° C. at 20% dry matter comprised between 10 and 10000 mPa·s, preferably between 20 and 5000 mPa·s, more preferably between 50 and 1000 mPa·s, most preferably between 75 and 500 mPa·s, and even more preferably around 150 mPa·s.

The Brookfield viscosity in aqueous dispersion at 25° C. at 20% by weight of dry matter is preferably comprised between 10 and 10000 mPa·s, preferably between 20 and 5000 mPa·s, more preferably between 50 and 1000 mPa·s, most preferably between 75 and 500 mPa·s, and even more preferably around 150 mPa·s. These Brookfield viscosity variants can be combined with the amylose content variants.

The viscosity within the meaning of the present invention is a Brookfield viscosity determined by means, for example, of a Brookfield RDVD-I+ viscometer (Brookfield Engineering Laboratories, INC. Middleboro, MA, USA) using one of the spindles referenced RV1, RV2, RV3, RV4, RV5, RV6 or RV7 and without using the equipment called "Helipath Stand". The rotation of the spindle is fixed at 20 revolutions per minute. The spindle, from RV1 to RV7, is selected so that the displayed viscosity value is comprised between 10% and 100% of the total possible viscosity scale with said spindle, as indicated by the manufacturer. To perform this viscosity measurement, 300 ml of an aqueous suspension or aqueous solution at 20% by weight of dry starch material prepared at 25° C. with mechanical stirring, for example with a deflocculating paddle at 250 rpm for 15 minutes, are placed in a low-shaped 400 ml beaker (diameter approximately 7.5 cm). The viscosity value is taken at the end of the 3rd rotation. The measurement is carried out following all the recommendations given by the manufacturer to obtain a reliable viscosity measurement, for example in the manual "Operating Instructions, Manual N ° M/92-021-M0101, Brookfield Digital Viscometer, Model DV-I+).

"Legume" within the meaning of the present invention means any plant belonging to the Caesalpiniaceae, Mimosaceae or Papilionaceae families and in particular any plant belonging to the Papilionaceae family such as, for example, peas, beans, broad bean, faba bean, lentil, or lupin.

Thus, the legume starch can be selected from pea starches, chickpea starches, broad bean starches, faba bean starches, bean starches, or lentil starches.

According to a preferred embodiment, the legume starch is a pea starch, and most preferably a *Pisum sativum* starch.

Furthermore, the legume starch can be a native pregelatinised starch, or a chemically modified starch, optionally pregelatinised.

The chemically modified legume starches can be selected from legume starches which have undergone at least one chemical modification, preferably at least two chemical modifications, selected from hydroxyalkylations, carboalkylations, hydrolyses, dextrinifications, succinylation, alkylation, acetylation, cationisation, anionisation. These chemical modifications are modifications of stabilisation of the legume starch, in other words of stabilisation of the viscosity in aqueous solution, in that they allow to reduce or eliminate the retrogradation of a gel or of an aqueous solution of said starch.

Thus, the modified legume starch used in the context of the present invention may be a hydroxyalkylated, carboxyalkylated, hydrolysed legume starch, a dextrin, or a combination thereof.

According to a preferred variant embodiment, the legume starch used in the context of the present invention is a hydrolysed and hydroxyalkylated legume starch. According to a very preferred variant, the legume starch used in the context of the present invention is a hydrolysed and hydroxypropylated legume starch.

For the purposes of the present invention, the term "hydroxypropylated legume starch" means a legume starch substituted with hydroxypropyl groups by any technique known to the person skilled in the art, for example by etherification reaction with the propylene oxide. In the context of the invention, a hydroxypropylated legume starch preferably has a content of hydroxypropyl groups comprised between 0.1 and 20% by dry weight, relative to the dry weight of hydroxypropylated starch, preferably between 1 and 10% by weight, more preferably between 5 and 9% by weight, and in particular close to 7% by weight. This content is in particular determined by proton Nuclear Magnetic Resonance spectrometry, in particular according to standard EN ISO 11543:2002 F.

For the purposes of the present invention, the term "hydrolysed legume starch" means a legume starch which has undergone a hydrolysis operation, that is to say an operation aimed at reducing its average molecular weight. The person skilled in the art knows how to obtain such starches, for example by chemical treatments such as oxidation and acid treatments, or else by enzymatic treatments. The person skilled in the art will naturally adjust the level of hydrolysis, and therefore of starch fluidisation, depending on the desired viscosity.

In the context of the invention, a hydrolysed legume starch, and optionally pre-gelatinised and/or including other chemical modifications as described above, preferably has an average molecular weight by weight comprised from 1 to 2000 kDa, preferably from 10 to 1000 kDa, most preferably from 20 to 1000 kDa, and even more preferably from 100 to 1000 kDa. For example, the molecular weight can be comprised from 200 to 800 kDa, from 200 to 500 kDa, from 200 to 400 kDa or else from 200 to 300 kDa. The average molecular weight by weight being determined by HPSEC-MALLS (high performance size exclusion chromatography coupled in line with multiple angle laser light scattering detection).

In particular, the starch after alkylation and hydrolysis will preferably be non-granular.

A hydrolysed and hydroxypropylated starch which can be used in a preferred manner in the context of the present invention is, for example, commercially available under the trade reference LYCOAT RS 720 or LYCOAT NG 720 by the company Roquette Frères.

In addition to these chemical modifications, the starch according to the invention may also have undergone physical treatments, in particular selected from the known operations of gelatinisation, pre-gelatinisation, extrusion, atomisation or drying, the operations of microwave or ultrasound, plasticisation or granulation treatment.

In particular, the starch according to the invention can preferably be rendered soluble. It can be rendered soluble by any technique known to the person skilled in the art, in particular by heat and/or mechanical treatment, for example by a cooking operation in an aqueous medium (pre-gelatinisation), optionally followed by a drying step when obtaining a pulverulent product is desired. The operation to make the starch soluble may well take place before or after the alkylation and/or hydrolysis of the starch. According to a preferred embodiment, the hydrolysed and hydroxyalkylated starch is pre-gelatinised. Such a starch is commercially available under the trade reference LYCOAT RS 720 by the company Roquette Frères. As an alternative to pre-gelatinisation, it is possible to gelatinise the starch during the preparation of the composition in which it will be used.

The hydrolysed and hydroxyalkylated legume starch, optionally pre-gelatinised according to the invention can also comprise any other physical and/or chemical modification, as long as this does not interfere with the desired properties of said starch. An example of chemical modification is in particular crosslinking.

In particular, in the context of the invention, the starch is present in a dry matter content comprised between 0.1% and 30% by weight, preferably between 1% and 25% by weight, relative to the total weight of the composition.

When the composition is a mascara, the starch is present in a dry matter content comprised between 1% and 20% by weight, relative to the total weight of the composition.

When the composition is an eye shadow or a care mask, the starch is present in a dry matter content comprised between 15% and 40% by weight, preferably between 20% and 25% by weight, relative to the total weight of the composition.

Plasticiser

The composition according to the invention also comprises at least two plasticisers selected from polyols.

Polyol means any organic molecule having in its structure at least 2 free hydroxy (—OH) groups. These polyols are preferably liquid at room temperature (25° C.).

As an example of polyols suitable for implementation in the composition can be selected from propylene glycol, butylene glycol, pentylene glycol, pentanediol, isoprene glycol, neopentyl glycol, glycerol, polyethylene glycols (PEG) having in particular from 4 to 8 ethylene glycol and/or sorbitol units.

Preferably, the polyols are glycerol and sorbitol, more preferably in admixture with pentylene glycol.

In a particularly preferred embodiment, the composition according to the invention does not include any plasticiser other than the polyols described above.

More particularly, the composition according to the invention can comprise:
1 to 15% by weight, preferably 5 to 10% by weight of glycerine, relative to the total weight of the composition
1 to 7% by weight, preferably 2 to 5% by weight of sorbitol relative to the total weight of the composition, and
1 to 5% by weight, preferably 2 to 4% by weight of pentylene glycol relative to the total weight of the composition.

When the composition is a mascara or an eye shadow, the composition according to the invention can comprise:
5 to 15% by weight of glycerine relative to the total weight of the composition,
3 to 6% by weight of sorbitol relative to the total weight of the composition, and
2 to 3% by weight of pentylene glycol relative to the total weight of the composition.

When the composition is a care mask, the composition according to the invention can comprise:
1 to 10% by weight of glycerine relative to the total weight of the composition,
3 to 6% by weight of sorbitol relative to the total weight of the composition, and
2 to 3% by weight of pentylene glycol relative to the total weight of the composition.

Aqueous Phase

The composition according to the invention also comprises an aqueous phase comprising water and optionally, at least one water-soluble solvent other than the polyols described above.

The term "water-soluble solvent" denotes in the present invention a compound which is liquid at room temperature and miscible with water (miscibility in water greater than 50% by weight at 25° C. and atmospheric pressure).

The water-soluble solvents which can be used in the compositions according to the invention can be volatile.

Among the water-soluble solvents which can be used in the compositions in accordance with the invention, mention may be made in particular of mono-alcohols having from 1 to 5 carbon atoms, in particular from 2 to 5 carbon atoms, such as ethanol and isopropanol, $C_3$-$C_4$ ketones and $C_2$-$C_4$ aldehydes.

According to a preferred embodiment, the composition according to the invention comprising at least one mono-alcohol having from 1 to 5 carbon atoms, preferably ethanol.

The introduction of a mono-alcohol having 1 to 5 carbon atoms, in particular 2 to 5 carbon atoms, allows to facilitate and accelerate the drying of the film.

According to a particular embodiment, the composition according to the invention comprises 25 to 65% by weight of water, preferably 30 to 60% by weight, relative to the total weight of the composition.

Hydrophilic Gelling Agent

The composition according to the invention can also comprise a hydrophilic gelling agent.

Gelling agent means a compound which, in the presence of a solvent, creates more or less strong intermacromolecular bonds thus inducing a three-dimensional network which freezes said solvent.

The hydrophilic gelling agent can be selected from polysaccharides, protein derivatives, synthetic or hemi-synthetic gels of polyester, in particular sulfonic type, polyacrylates or polymethacrylates and their derivatives.

Among the polysaccharides, mention may be made of:
algae extracts such as agar-agar, carrageenan (iota, kappa, lambda), alginates, in particular of Na or Ca;
the exudates of microorganisms such as xanthan gum and its derivatives, such as the product sold under the trade name "Rheosan" by the company Rhodia Chimie, the gellan gum sold under the trade name "Kelcogel F" by the company NUTRASWEET-KELCO or else iota carrageenan sold under the trade names "Seaspen PF 357" or "Viscarin SD 389" by the company FMC, or *sclerotium* gum (*sclerotium* gum or *Sclerotium rolfssii* gum), produced by the bacteria *Sclerotium rolfissii*, available under the name Naturajel® by the company DIY Cosmetics or Amigel® by the company Alban Muller;
fruit extracts such as pectins;
gelling agents of animal origin, such as protein derivatives, in particular gelatine, from beef or fish, caseinates;
polysaccharides having a lateral chain and 6 neutral sugars as described in document FR-A-2759377, and mixtures thereof.

Among the polyacrylates, mention may be made of:
crosslinked polymers of acrylic acid, of methyl acrylate and of polyoxyethylenated 25 EO behenyl methacrylate (INCI name: Acrylates/Beheneth-25 Methacrylate Copolymer), such as that sold under the name Novethix L-10 Polymer by the company Lubrizol Advanced Materials, or Rheostyl™ 90 N from Arkema (INCI: Acrylates/Beheneth-25 Methacrylate copolymer)

Preferably, the hydrophilic gelling agent is selected from polysaccharides, and more preferably from xanthan gum, *sclerotium* gum, and mixture thereof, for example the mixture marketed under the name Actigum VSX 20 by the company Cargill.

According to a preferred embodiment, the mixture of xanthan gum and *sclerotium* gum has a weight ratio (xanthan:*sclerotium*) comprised between 1:2 to 2:1.

The hydrophilic gelling agent is preferably present in the composition according to the invention at a concentration which may range from 0.1 to 10%, more preferably from 0.2 to 5%, by weight, relative to the total weight of the composition.

Emulsifying Agent

The composition according to the invention can also comprise an emulsifying agent.

These emulsifying agents can be selected from non-ionic, anionic, cationic, amphoteric surfactants or else polymeric surfactants.

According to one embodiment, the surfactants which can be used in the context of the invention are selected from non-ionic surfactants of HLB comprised between 8 and 20 at 25° C. Mention may in particular be made of:
- esters and ethers of monosaccharides such as the mixture of cetylstearyl glucoside and cetyl and stearyl alcohols such as Montanov 68 from Seppic;
- oxyethylenated and/or oxypropylenated ethers (which may include from 1 to 150 oxyethylenated and/or oxypropylenated groups) of glycerol;
- oxyethylenated and/or oxypropylenated ethers (which may include from 1 to 150 oxyethylenated and/or oxypropylenated groups) of fatty alcohols (in particular of C8-C24 alcohol, and preferably of C12-C18) such as cetearyl alcohol oxyethylene ether with 30 oxyethylenated groups (CTFA name "Ceteareth-30"), stearyl alcohol oxyethylene ether with 20 oxyethylenated groups (CTFA name "Steareth-20"), the oxyethylene ether of the mixture of C12-C15 fatty alcohols including 7 oxyethylenated groups (CTFA name "C12-15 Pareth-7") in particular marketed under the name NEODOL 25-70 by SHELL CHEMICALS
- fatty acid esters (in particular of C8-C24 acid, and preferably of C16-C22 acid) and of polyethylene glycol (which may comprise from 1 to 150 ethylene glycol units) such as PEG-50 stearate and PEG-40 monostearate in particular, marketed under the name MYRJ 52P® by the company ICI UNIQUEMA, or else PEG-30 glyceryl stearate in particular marketed under the name TAGAT S® by the company Evonik GOLDSCHMIDT;
- fatty acid esters (in particular of C8-C24 acid, and preferably of C16-C22 acid) and oxyethylenated and/or oxypropylenated glycerol ethers (which may contain from 1 to 150 oxyethylenated and/or oxypropylenated groups), such as PEG-200 glyceryl monostearate, in particular sold under the name Simulsol 220 TM® by the company SEPPIC; polyethoxylated glyceryl stearate with 30 ethylene oxide groups such as the product TAGAT S® sold by the company Evonik GOLDSCHMIDT, polyethoxylated glyceryl oleate with 30 ethylene oxide groups such as the product TAGAT O® sold by the company Evonik GOLDSCHMIDT, polyethoxylated glyceryl cocoate containing 30 ethylene oxide groups such as the product VARIONIC LI 13® sold by the company SHEREX, polyethoxylated glyceryl isostearate containing 30 ethylene oxide groups like the product TAGAT L® sold by the company Evonik GOLDSCHMIDT and polyethoxylated glyceryl laurate with 30 ethylene oxide groups such as the product TAGAT I® by the company Evonik GOLDSCHMIDT,
- fatty acid esters (in particular of C8-C24 acid, and preferably C16-C22 acid) and oxyethylenated and/or oxypropylenated sorbitol ethers (which may contain from 1 to 150 oxyethylenated and/or oxypropylenated groups), such as polysorbate 20 in particular sold under the name Tween 200 by the company CRODA, polysorbate 60 in particular sold under the name Tween 600 by the company CRODA,
- dimethicone copolyol, such as that sold under the name Q2-5220® by the company DOW CORNING,
- dimethicone copolyol benzoate (FINSOLV SLB 101® and 201® by the company FINTEX),
- copolymers of propylene oxide and ethylene oxide, also called EO/PO polycondensates
- lysophospholipids, in particular lysophosphatidylcholine of the following formula [CHEM1]:

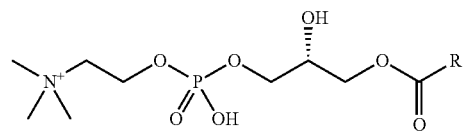

[Chem. 1]

where R is a fatty acid chain, comprising in particular from 10 to 25 carbon atoms, preferably from 15 to 20. Preferably, the lysophospholipid used in the composition of the invention is obtained from soybeans. More preferably, its INCI name is *glycine soja* (soybean) seed extract. For example, use is made of the mixture of 80% by weight glycerine and 20% by weight *glycine soja* (soybean) seed extract marketed by Kemin under the name Lysofix Liquid®;
- emulsifying waxes such as the self-emulsifying wax sold under the name Polawax NF by Croda, or the PEG-8 beeswax sold under the name Apifil by Gattefossé, and mixtures thereof.

According to a preferred embodiment, the emulsifying agent of HLB comprised between 8 and 20 is selected from fatty acid esters and oxyethylenated and/or oxypropylenated sorbitol ethers, lysophospholipids, emulsifying waxes such as self-emulsifying waxes or hydrolysed waxes, and mixtures thereof.

Lysophospholipids such as Lysofix Liquid® allow the composition to thicken, thus improving its spreading.

According to one embodiment, the surfactants which can be used in the composition according to the invention are selected from non-ionic surfactants with an HLB of less than or equal to 8 at 25° C. Mention may in particular be made of:
- esters and ethers of monosaccharides such as sucrose stearate, sucrose cocoate, sorbitan stearate and mixtures thereof, such as Arlatone 2121® marketed by the company ICI;
- oxyethylenated and/or oxypropylenated ethers (which may include from 1 to 150 oxyethylenated and/or oxypropylenated groups) of fatty alcohols (in particular of C8-C24 alcohol, and preferably of C12-C18 alcohol) such as stearyl alcohol oxyethylene ether with 2 oxyethylenated groups (CTFA name "Steareth-2");

the esters of fatty acids (in particular of C8-C24 acid, and preferably of C16-C22 acid) and of polyol, in particular of glycerol or of sorbitol, such as glyceryl stearate, such as the product sold under the name TEGIN MR by the company Evonik GOLDSCHMIDT, glyceryl laurate such as the product sold under the name IMWITOR 312® by the company HULS, polyglyceryl-2 stearate, polyglyceryl-2 triisostearate, sorbitan tristearate, ricinoleate glyceryl;

lecithins, such as soybean lecithins (such as Emulmetik 100 J from Cargill, or Biophilic H from Lucas Meyer);

the mixture of cyclomethicone/dimethicone copolyol sold under the name Q2-3225C® by the company DOW CORNING.

According to a preferred embodiment, the non-ionic surfactant of HLB less than or equal to 8 at 25° C. is selected from esters of fatty acids and of polyol, preferably polyglyceryl-2 triisostearate such as that marketed under the reference CITHROL PG32IS-LQ by the company Croda (INCI POLYGLYCERYL-3 DIISOSTEARATE).

The composition according to the invention may contain from 0.01 to 30% by weight of emulsifying agent, relative to the total weight of said composition, preferably from 0.1 to 15% by weight, and more preferably from 0.2 to 13% by weight.

Film-Forming Agent

The composition according to the invention can also comprise an additional film-forming agent other than starch, in particular a film-forming polymer.

Among the film-forming polymers which can be used in the compositions of the present invention, mention may be made of synthetic polymers, of free-radical type or of polycondensate type, polymers of natural origin, and mixtures thereof.

"Radical film-forming polymer" means a polymer obtained by polymerisation of monomers containing in particular ethylenic unsaturation, each monomer being capable of homopolymerising (unlike polycondensates).

The radical type film-forming polymers can in particular be vinyl polymers or copolymers, in particular acrylic polymers.

The vinyl film-forming polymers can result from the polymerisation of ethylenically unsaturated monomers having at least one acid group and/or esters of these acid monomers and/or amides of these acid monomers.

As monomer carrying an acid group, use can be made of unsaturated α,β-ethylenic carboxylic acids such as acrylic acid, methacrylic acid, crotonic acid, maleic acid, itaconic acid. Use is preferably made of (meth)acrylic acid, itaconic acid and crotonic acid, and more preferably itaconic acid (for example a metal salt of poly(itaconic acid) such as that marketed under the trade reference REVCARE NE 100S by the company Itaconix).

The esters of acid monomers are advantageously selected from esters of (meth)acrylic acid (also called (meth)acrylates), in particular alkyl (meth)acrylates, in particular C1-C30 preferably C1-C20 alkyl (meth)acrylates, aryl (meth)acrylates, in particular C6-C10 aryl (meth)acrylates, hydroxyalkyl (meth)acrylates, in particular C2-C6 hydroxyalkyl (meth)acrylates.

Mention may be made, among the alkyl (meth)acrylates, of methyl methacrylate, ethyl methacrylate, butyl methacrylate, isobutyl methacrylate, 2-ethylhexyl methacrylate, lauryl methacrylate, cyclohexyl methacrylate.

Among the hydroxyalkyl (meth)acrylates, mention may be made of hydroxyethyl acrylate, 2-hydroxypropyl acrylate, hydroxyethyl methacrylate and 2-hydroxypropyl methacrylate.

Among the aryl (meth)acrylates, mention may be made of benzyl acrylate and phenyl acrylate.

Particularly preferred esters of (meth)acrylic acid are alkyl (meth)acrylates.

According to the present invention, the alkyl group of the esters can be either fluorinated or perfluorinated, that is to say that part or all of the hydrogen atoms of the alkyl group are substituted by fluorine atoms.

As amides of acid monomers, mention may for example be made of (meth)acrylamides, and in particular N-alkyl (meth)acrylamides, in particular C2-C12 alkyl. Among the N-alkyl (meth)acrylamides, mention may be made of N-ethyl acrylamide, N-t-butyl acrylamide, N-t-octyl acrylamide and N-undecylacrylamide.

The vinyl film-forming polymers can also result from the homopolymerisation or the copolymerisation of monomers selected from vinyl esters and styrene monomers. In particular, these monomers can be polymerised with acid monomers and/or their esters and/or their amides, such as those mentioned above.

As an example of vinyl esters, mention may be made of vinyl acetate, vinyl neodecanoate, vinyl pivalate, vinyl benzoate and vinyl t-butyl benzoate.

Mention may be made, as styrene monomers, of styrene and alpha-methyl styrene.

Among the film-forming polycondensates, mention may be made of polyurethanes, polyesters, polyester amides, polyamides, and epoxy ester resins, polyureas.

Polyurethanes can be selected from anionic, cationic, non-ionic or amphoteric polyurethanes, acrylic polyurethanes, poly-urethanes-polyvinylpirrolidones, polyester-polyurethanes, polyester-polyurethanes, polyureas, polyurea-polyurethanes, and mixtures thereof.

Polyesters can be obtained, in a known manner, by polycondensation of dicarboxylic acids with polyols, in particular diols.

The dicarboxylic acid can be aliphatic, alicyclic or aromatic. As examples of such acids, mention may be made of: oxalic acid, malonic acid, dimethylmalonic acid, succinic acid, glutaric acid, adipic acid, pimelic acid, 2,2-dimethylglutaric acid, azelaic acid, suberic acid, sebacic acid, fumaric acid, maleic acid, itaconic acid, phthalic acid, dodecanedioic acid, 1,3-cyclohexanedicarboxylic acid, 1,4-cyclohexanedicarboxylic acid, isophthalic acid, terephthalic acid, 2,5-norbornane dicarboxylic acid, diglycolic acid, thiodipropionic acid, 2,5-naphthalenedicarboxylic acid, 2,6-naphthalenedicarboxylic acid. These dicarboxylic acid monomers can be used alone or in combination of at least two dicarboxylic acid monomers. Among these monomers, phthalic acid, isophthalic acid and terephthalic acid are preferably selected.

The diol can be selected from aliphatic, alicyclic and aromatic diols. Use is preferably made of diol selected from: ethylene glycol, diethylene glycol, triethylene glycol, 1,3-propanediol, cyclohexane dimethanol and 4-butanediol. As other polyols, glycerol, pentaerythritol, sorbitol, trimethylol propane can be used.

Polyester amides can be obtained in a manner similar to polyesters, by polycondensation of diacids with diamines or amine alcohols. As diamine, ethylenediamine, hexamethylenediamine, meta- or para-phenylenediamine can be used. As the aminoalcohol, monoethanolamine can be used.

The polyester may further comprise at least one monomer carrying at least one —SO3M group, with M representing a hydrogen atom, an ammonium ion NH4+ or a metal ion, such as for example an ion Na+, Li+, K+, Mg2+, Ca2+, Cu2+, Fe2+, Fe3+. It is in particular possible to use a bifunctional aromatic monomer comprising such an —SO3M group.

The aromatic nucleus of the bifunctional aromatic monomer further carrying an —SO3M group as described above can be selected, for example, from the benzene, naphthalene, anthracene, diphenyl, oxidiphenyl and sulfonyldiphenyl, methylenediphenyl rings. As an example of a bifunctional aromatic monomer further carrying an —SO3M group, mention may be made of: sulfoisophthalic acid, sulfoterephthalic acid, sulfophthalic acid, 4-sulfonaphthalene-2,7-dicarboxylic acid.

It is preferred to use copolymers based on isophthalate/sulfoisophthalate, and more particularly copolymers obtained by condensation of di-ethylene glycol, cyclohexane di-methanol, isophthalic acid, sulfoisophthalic acid.

The polymers of natural origin, optionally modified, can be selected from shellac resin, sandarac gum, arabic gum (ACACIA SENEGAL GUM), dammars, elemis, copals, cellulose polymers, polymers extracted from the fruit of *Caesalpinia spinosa* and/or from the alga *Kappaphycus alvarezii* (such as the Filmexel® product marketed by the company Silab), and mixtures thereof. A natural polymer such as Filmexel® allows in particular to improve the hold of the film obtained from the composition according to the invention.

According to a first embodiment of the invention, the film-forming polymer can be a water-soluble polymer and may then be present in the aqueous continuous phase of the composition according to the invention.

According to a second embodiment, the film-forming polymer may also be present in a composition of the invention in the form of particles in dispersion in an aqueous phase or in a non-aqueous solvent phase, generally known under the name of latex or pseudolatex. The techniques for preparing these dispersions are well known to the person skilled in the art.

As aqueous dispersion of film-forming polymer, use can be made of the acrylic dispersions sold under the names Neocryl XK-90®, Neocryl A-1070®, Neocryl A-1090®, Neocryl BT-62®, Neocryl A-1079® and Neocryl A-523® by the company AVECIA-NEORESINS, Dow Latex 432® by the company DOW CHEMICAL, Daitosol 5000 AD® or Daitosol 5000 SJ® by the company DAITO KASEY KOGYO; Syntran 5760@ by the company Interpolymer, Allianz OPT by the company ROHM & HAAS, the aqueous dispersions of acrylic or styrene/acrylic polymers sold under the brand name JONCRYL® by the company JOHNSON POLYMER or the aqueous dispersions of polyurethane sold under the names Neorez R-981® and Neorez R-974® by the company AVECIA-NEORESINS, the Avalure UR-405®, Avalure UR-410®, Avalure UR-425®, Avalure UR-450®, Sancure 8750, Sancure 861®, Sancure 878® and Sancure 2060® by the company GOODRICH, Impranil 85® by the company BAYER, Aquamere H-1511® by the company HYDROMER; sulfopolyesters sold under the trade name Eastman AQ® by the company Eastman Chemical Products, vinyl dispersions such as Mexomer PAM® by the company CHLMEX and mixtures thereof.

As examples of non-aqueous dispersions of film-forming polymer, mention may be made of acrylic dispersions in isododecane such as Mexomer PAP® by the company CHIMEX, dispersions of particles of a grafted ethylenic polymer, preferably acrylic, in a liquid fatty phase, the ethylenic polymer being advantageously dispersed in the absence of additional stabiliser at the surface of the particles as described in particular in document WO 04/055081.

According to a third embodiment, the film-forming polymer can be a polymer dissolved in a liquid fatty phase comprising oils or organic solvents (the film-forming polymer is then said to be a liposoluble polymer).

As an example of a liposoluble polymer, mention may be made of vinyl ester copolymers (the vinyl group being directly bonded to the oxygen atom of the ester group and the vinyl ester having a saturated, linear or branched hydrocarbon radical, having from 1 to 19 carbon atoms, bonded to the carbonyl of the ester group) and at least one other monomer which may be a vinyl ester (different from the vinyl ester already present), an α-olefin (having 8 to 28 carbon atoms), an alkyl vinyl ether (whose alkyl group contains from 2 to 18 carbon atoms), or an allyl or methallyl ester (having a saturated, linear or branched hydrocarbon radical, having from 1 to 19 carbon atoms, bonded to the carbonyl of the ester group).

These copolymers can be crosslinked using crosslinking agents which can be either of the vinyl type, or of the allyl or methallyl type, such as tetraallyloxyethane, divinylbenzene, divinyl octanedioate, divinyl dodecanedioate, and divinyl octadecanedioate.

As examples of these copolymers, mention may be made of the copolymers: vinyl acetate/allyl stearate, vinyl acetate/vinyl laurate, vinyl acetate/vinyl stearate, vinyl acetate/octadecene, vinyl acetate/octadecylvinylether, vinyl propionate/allyl laurate, vinyl propionate/vinyl laurate, vinyl stearate/octadecene-1, vinyl acetate/dodecene-1, vinyl stearate/ethyl vinyl ether, vinyl propionate/cetyl vinyl ether, vinyl stearate/allyl acetate, 2,2-dimethyl vinyl octanoate/vinyl laurate, 2,2-dimethyl allyl pentanoate/vinyl laurate, vinyl dimethyl propionate/vinyl stearate, allyl dimethyl propionate/vinyl stearate, vinyl propionate/vinyl stearate, crosslinked with 0.2% divinyl benzene, vinyl dimethyl propionate/vinyl laurate, crosslinked with 0.2% divinyl benzene, vinyl acetate/octadecyl vinyl ether, crosslinked with 0.2% tetraallyloxyethane, vinyl acetate/allyl stearate crosslinked with 0.2% divinyl benzene, vinyl acetate/octadecene-1 crosslinked with 0.2% divinyl benzene and allyl propionate/allyl stearate crosslinked with 0.2% divinyl benzene.

As fat-soluble film-forming polymers, mention may also be made of fat-soluble copolymers, and in particular those resulting from the copolymerisation of vinyl esters having from 9 to 22 carbon atoms or of alkyl acrylates or methacrylates, the allyl radicals having from 10 to 20 carbon atoms.

Such liposoluble copolymers can be selected from vinyl polystearate copolymers, vinyl polystearate copolymers crosslinked using divinylbenzene, diallyl ether copolymers or diallyl phthalate copolymers, poly(stearyl methacrylate) copolymers, polyvinyl laurate copolymers, poly(lauryl methacrylate) copolymers, these poly(meth)acrylates can be crosslinked using methylene glycol dimethacrylate or tetraethylene glycol.

The liposoluble copolymers defined above are known and in particular described in application FR-A-2232303; they can have an average molecular weight by weight ranging from 2000 to 500000 and preferably from 4000 to 200000.

Mention may also be made of liposoluble homopolymers, and in particular those resulting from the homopolymerisation of vinyl esters having from 9 to 22 carbon atoms or of alkyl acrylates or methacrylates, the alkyl radicals having from 2 to 24 carbon atoms.

As examples of fat-soluble homopolymers, mention may in particular be made of: polyvinyl laurate and poly(lauryl methacrylate), these poly(meth)acrylates possibly being crosslinked using ethylene glycol dimethacrylate or tetraethylene glycol.

As liposoluble film-forming polymers that can be used in the invention, mention may also be made of polyalkylenes and in particular copolymers of C2-C20 alkenes, such as polybutene, alkylcelluloses with a linear or branched alkyl radical, C1 to C8 saturated or unsaturated such as ethylcellulose and propylcellulose, vinylpyrrolidone (VP) copolymers and in particular vinylpyrrolidone copolymers and C2 to C40 and better still C3 to C20 alkene copolymers. As an example of VP copolymer which can be used in the invention, mention may be made of the copolymer of VP/vinyl acetate, VP/ethyl methacrylate, butylated polyvinylpyrrolidone (PVP), VP/ethyl methacrylate/methacrylic acid, VP/eicosene, VP/hexadecene, VP/triacontene, VP/styrene, VP/acrylic acid/lauryl methacrylate.

Mention may also be made of silicone resins, generally soluble or swellable in silicone oils, which are crosslinked polyorganosiloxane polymers. The nomenclature of silicone resins is known under the name "MDTQ", the resin being described according to the different siloxane monomer units that it comprises, each of the letters "MDTQ" characterising a type of unit.

As examples of commercially available polymethylsilsesquioxane resins, mention may be made of those marketed by the company Wacker under the reference Resin MK such as Belsil PMS MK, and by the company SHIN-ETSU under the references KR-220L.

As siloxysilicate resins, mention may be made of trimethylsiloxysilicate (TMS) resins such as those marketed under the reference SR1000 by the company General Electric or under the reference TMS 803 by the company Wacker. Mention may also be made of the trimethylsiloxysilicate resins marketed in a solvent such as cyclomethicone, sold under the name "KF-7312J" by the company Shin-Etsu, "DOWSIL™ RSN-0749", "DOWSIL™ 593 Fluid" by the company Dow Corning.

Mention may also be made of silicone resin copolymers such as those mentioned above with polydimethylsiloxanes, such as the pressure-sensitive adhesive copolymers marketed by the company Dow Coing under the reference BIO-PSA and described in document U.S. Pat. No. 5,162,410 or else silicone copolymers resulting from the reaction of a silicone resin, such as those described above, and of a diorganosiloxane as described in document WO 2004/073626.

Finally, mention may be made of the acrylate/polytrimethylsiloxymethacrylate copolymer comprising a dendrimer carbosiloxane structure grafted onto a vinyl backbone available commercially under the references DOW CORNING FA 4002 ID or DOW CORNING FA 4001 CM.

It is also possible to use silicone polyamides of the polyorganosiloxane type such as those described in documents U.S. Pat. Nos. 5,874,069, 5,919,441, 6,051,216 and 5,981,680.

According to a preferred embodiment, the additional film-forming polymer is selected from polymers of natural origin, optionally modified, preferably from polymers extracted from the fruit of *Caesalpinia spinosa* and/or from the alga *Kappaphycus alvarezii* (such as the Filmexel® product marketed by the company Silab), In a preferred embodiment, the composition according to the invention does not comprise a film-forming polymer other than legume starch.

Silicone Elastomers

The composition according to the invention can also comprise a silicone elastomer.

The addition of a silicone elastomer allows in particular to limit the lint phenomenon liable to appear during the application of the composition according to the invention.

Among the latter, mention may be made of the at least partially crosslinked polymers resulting from the reaction of an organopolysiloxane carrying unsaturated groups, such as vinyl or allyl groups, located at the end or in the middle of the chain, preferably on a silicon atom, with another reactive silicone compound such as an organohydrogenpolysiloxane. These polymers are usually available in the form of a gel in a volatile or non-volatile silicone solvent or in a hydrocarbon solvent. Examples of such elastomers are marketed in particular by the company SHIN ETSU under the trade names KSG-6, KSG-16, KSG-31, KSG-32, KSG-41, KSG-42, KSG-43 and KSG-44, and by the company DOW CORNING under the trade names DOWSIL™ 9040 and DOWSIL™ 9041. Another oily gelling agent consists of a silicone polymer, obtained by self-polymerisation of an organopolysiloxane functionalised with epoxy and hydrosilyl groups, in the presence of a catalyst, which is commercially available by the company GENERAL ELECTRIC under the trade name VELVESIL® 125. Another lipophilic gelling agent consists of a cyclic dimethicone/vinyldimethicone copolymer such as that sold by the company JEEN under the trade name JEESILC® PS (including PS-VH, PS-VHLV, PS-CM, PS-CMLV and PS-DM).

According to a preferred embodiment, the silicone elastomer can be an emulsifying agent, preferably selected from polyoxyalkylenated and polyglycerolated silicone elastomers.

As polyoxyalkylenated silicone elastomers, mention may be made of those described in U.S. Pat. Nos. 5,236,986, 5,412,004, 5,837,793, 5,811,487.

As polyoxyalkylenated silicone elastomers, use can be made of: those with the INCI name PEG-10 Dimethicone/Vinyl dimethicone crosspolymer: such as those marketed under the names "KSG-21", "KSG-20", by Shin Etsu; —those of INCI name Lauryl PEG-15 Dimethicone/Vinyldimethicone Crosspolymer: like those marketed under the names "KSG-30" and "KSG-31", "KSG-32" "(in isododecane), "KSG-33" (in trioctanoine), "KSG-210", "KSG-310" (in mineral oil), "KSG-320" (in isododecane), "KSG-330", "KSG-340" by the company Shin Etsu.

As polyglycerolated silicone elastomers, use can be made of: —those with the INCI name Dimethicone (and) Dimethicone/Polyglycerine-3 crosspolymer: such as those marketed under the names "KSG-710" by Shin Etsu; those with the INCI name Lauryl Dimethicone/Polyglycerine-3 crosspolymer: such as those sold under the names "KSG-840" (in squalene) by the company Shin Etsu.

Oils

The composition according to the invention can comprise at least one oil selected from volatile oils and/or non-volatile oils, and mixtures thereof.

For the purposes of the invention, "volatile oil" means an oil capable of evaporating in contact with keratin fibres in less than one hour, at room temperature and atmospheric pressure. The volatile organic solvent(s) and the volatile oils of the invention are organic solvents and volatile cosmetic oils, which are liquid at room temperature, having a non-zero vapour pressure, at room temperature and atmospheric pressure, ranging in particular from 0.13 Pa to 40000 Pa ($10^{-3}$ to 300 mm Hg), in particular ranging from 1.3 Pa to 13000 Pa (0.01 to 100 mm Hg), and more particularly ranging from 1.3 Pa to 1300 Pa (0.01 to 10 mm Hg).

The volatile oil can be hydrocarbonated. The volatile hydrocarbon oil can be selected from hydrocarbon oils having from 7 to 16 carbon atoms. As volatile hydrocarbon-based oil having from 7 to 16 carbon atoms, mention may in particular be made of branched C8-C16 alkanes such as C8-C16 iso-alkanes (also called isoparaffins), isododecane, isodecane, isohexadecane and for example the oils sold under the trade names of Isopars or Permyls, C8-C16 branched esters such as iso-hexyl neopentanoate, and mixtures thereof. Preferably, the volatile hydrocarbon oil having 8 to 16 carbon atoms is selected from isododecane, isodecane, isohexadecane and mixtures thereof, and is in particular isododecane.

The volatile oil can be a volatile linear alkane. According to one embodiment, an alkane suitable for the invention can be a volatile linear alkane comprising from 7 to 14 carbon atoms. Such a volatile linear alkane can advantageously be of plant origin. As an example of alkanes suitable for the invention, mention may be made of the alkanes described in the patent applications of the company Cognis WO 2007/1068371, or WO2008/155059 (mixtures of distinct alkanes and differing by at least one carbon). These alkanes are obtained from fatty alcohols, in turn obtained from coconut or palm oil. As an example of linear alkanes suitable for the invention, mention may be made of n-heptane (C7), n-octane (C8), n-nonane (C9), n-decane (C10), n-undecane (C11), n-dodecane (C12), n-tridecane (C13), n-tetradecane (C14), and mixtures thereof. According to a particular embodiment, the volatile linear alkane is selected from n-nonane, n-undecane, n-dodecane, n-tridecane, n-tetradecane, and mixtures thereof. According to a preferred embodiment, mention may be made of mixtures of n-undecane (C11) and of n-tridecane (C13) obtained in examples 1 and 2 of application WO2008/15505 by the company Cognis. Mention may also be made of the mixture of n-undecane (C11) and of n-tridecane (C13) marketed by the company BASF under the name CETIOL ULTIMATE. Mention may also be made of n-dodecane (C12) and n-tetradecane (C14) sold by Sasol respectively under the references PARAFOL 12-97 and PARAFOL 14-97, as well as mixtures thereof. It is possible to use the volatile linear alkane alone or preferably a mixture of at least two distinct volatile linear alkanes, differing from each other by a carbon number n of at least 1, in particular differing from each other by a carbon number of 1 or 2.

The volatile oil can be a volatile silicone oil such as cyclic polysiloxanes, linear polysiloxanes and mixtures thereof. As linear volatile polysiloxanes, mention may be made of hexamethyldisiloxane, octamethyltrisiloxane, decamethyltetrasiloxane, tetradecamethylhexasiloxane and hexadecamethylheptasiloxane. As volatile cyclic polysiloxanes, mention may be made of hexamethylcyclotrisiloxane, octamethylcylotetrasiloxane, decamethylcyclopentasiloxane and dodecamethylcyclohexasiloxane.

Alternatively or additionally, the composition produced may comprise at least one volatile fluorinated oil.

The term "non-volatile oil" means an oil which remains on the keratin fibres at room temperature and atmospheric pressure for at least several hours and in particular having a vapour pressure of less than $10^{-3}$ mm Hg (0.13 Pa).

The non-volatile oils can, in particular, be selected from hydrocarbon-based and fluorinated oils and/or non-volatile silicone oils.

As non-volatile hydrocarbon-based oil, mention may in particular be made of:
hydrocarbon oils of animal origin,
hydrocarbon oils of plant origin such as linear C4 to C36 alkanes, preferably C11-C21 alkanes such as phyto squalane or Emogreen L15 from SEPPIC (C15-19 alkane), or else such as phytostearyl esters, such as phytostearyl oleate, physostearyl isostearate and lauroyl/octyldodecyl/phytostearyl glutamate (AJINOMOTO, ELDEW PS203), triglycerides consisting of esters of fatty acids and glycerol, in particular, whose fatty acids may have chain lengths varying from C4 to C36, and in particular from C18 to C36; these oils can be linear or branched, saturated or unsaturated; these oils can, in particular, be heptanoic or octanoic triglycerides, shea, alfalfa, poppy, pumpkin, millet, barley, *quinoa*, rye, bancoulier, passionflower oil, shea butter, aloe vera oil, sweet almond oil, peach almond oil, peanut oil, argan oil, avocado oil, baobab oil, borage oil, broccoli oil, calendula oil, camelina oil, carrot oil, safflower oil, hemp oil, rapeseed oil, cottonseed oil, coconut oil, pumpkin seed oil, wheat germ oil, jojoba oil, lily oil, macadamia oil, corn oil, meadowfoam oil, St. John's wort oil, monoi oil, hazelnut oil, apricot kernel oil, walnut oil, olive oil, evening primrose oil, palm oil, blackcurrant seed oil, kiwi seed oil, grape seed oil, pistachio oil, red kuri squash oil, pumpkin oil, *quinoa* oil, musk rose oil, sesame oil, soybean oil, sunflower oil, castor oil, and watermelon oil, and mixtures thereof, or also caprylic/capric acid triglycerides, such as those sold by the company STEARINERIES DUBOIS or those sold under the names MIGLYOL 8100, 812@ and 818@ by the company DYNAMIT NOBEL,
synthetic ethers having 10 to 40 carbon atoms;
synthetic esters, such as oils of formula R1 COOR2, wherein R1 represents a residue of a linear or branched fatty acid comprising from 1 to 40 carbon atoms and R2 represents a hydrocarbon chain, in particular a branched chain containing from 1 to 40 carbon atoms provided that R1+R2 is ≥10. The esters can be, in particular, selected from esters of alcohol and of fatty acids, such as, for example, cetostearyl octanoate, esters of isopropyl alcohol, such as isopropyl myristate, isopropyl palmitate, ethyl palmitate, 2-ethyl-hexyl palmitate, isopropyl stearate or isostearate, isostearyl isostearate, octyl stearate, hydroxylated esters, such as isostearyl lactacte, octyl hydroxystearate, diisopropyl adipate, heptanoates, and in particular isostearyl heptanoate, octanoates, decanoates or ricinoleates of alcohols or polyalcohols, such as propylene glycol dioctanoate, cetyl octanoate, tridecyl octanoate, ethyl 2-hexyl 4-diheptanoate and palmitate, alkyl benzoate, polyethylene glycol diheptanoate, propylene glycol dietyl 2-hexanoate and mixtures thereof, C12-C15 alcohol benzoates, hexyl laurate, neopentanoic acid esters, such as isodecyl neopentanoate, isotridecyl neopentanoate, isostearyl neopentanoate, octyldocecyl neopentanoate, isononanoic acid esters, such as isononyl isononanoate, isotridecyl isononanoate, octyl isononanoate, hydroxy esters such as isostearyl lactate, di-isostearyl malate;
polyol esters and pentaerythritol esters, such as dipentaerythritol tetrahydroxystearate/tetraisostearate,
diol dimer and diacid dimer esters, such as Lusplan DD-DA5® and Lusplan DD-DA7®, marketed by the company NIPPON FINE CHEMICAL and described in application US 2004-175338, diol dimer and diacid dimer copolymers and their esters, such as dilinoleyl diol dimer/dilinoleic dimer copolymers and their esters, such as, for example, Plandool-G, polyol and diacid dimer copolymers, and their esters, such as Hailuscent ISDA, fatty alcohols that are liquid at room temperature with a branched and/or unsaturated carbon chain having 12 to 26 carbon atoms, such as 2-octyldodecanol, isostearyl alcohol, oleic alcohol, 2-hexyldecanol, 2-blatyloctanol, and 2-undecylpentadecanol, higher $C_{12}$-$C_{22}$ fatty acids, such as oleic acid, linoleic acid, and mixtures thereof, di-alkyl carbonates, the 2 alkyl chains possibly being identical or different, such as dicaprylyl carbonate marketed under the name CETIOL CC®, by COGNIS, oils of high molar mass having, in particular, a molar mass ranging from approximately 400 to approximately 10000 g/mol, in particular, from approximately 650 to approximately 10000 g/mol, in particular, from approximately 750 to approximately 7500 g/mol, and more particularly, varying from approximately 1000 to approximately 5000 g/mol, silicone oils, such as phenylated silicones such as BELSIL PDM 1000 by the company WACIER (MM=9000 g/mol). Other non-volatile silicone oils which can be used in the composition according to the invention can be non-volatile polydimethylsiloxanes (PDMS), PDMS including alkyl or alkoxy groups which are pendant and/or at silicone chain ends, groups each having from 2 to 24 carbon atoms, phenylated silicones, such as phenyl trimethicones, phenyl dimethicones, phenol trimethylsiloxy diphenylsiloxanes, diphenyl dimethicones, diphenyl methyldiphenyl trisiloxanes, and 2-phenylethyl trimethylsiloxysilicates, dimethicones or phenyltrimethicones having a viscosity less than or equal to 100 cSt, and mixtures thereof, the fluorinated oils which can be used in the invention are in particular fluorosilicon oils, fluorinated polyethers, fluorinated silicones as described in document EP-A-847752.

Waxes

The composition according to the invention can comprise at least one wax.

The wax considered in the context of the present invention is generally a lipophilic compound, solid at room temperature (25° C.), with a reversible solid/liquid change of state, having a melting point higher than or equal to 30° C. up to 120° C.

In particular, the waxes suitable for the invention can have a melting point greater than approximately 45° C., and in particular greater than 55° C. The melting point of the wax can be measured using a differential scanning calorimeter (D.S.C.), for example the calorimeter sold under the name DSC 30 by the company METLER.

The waxes capable of being used in the compositions according to the invention are selected from waxes, which are solid, deformable or not at room temperature, of animal, plant, mineral or synthetic origin, and mixtures thereof.

The wax can also have a hardness ranging from 0.05 MPa to 30 MPa, and preferably ranging from 6 MPa to 15 MPa. The hardness is determined by measuring the compressive force measured at 20° C. using the texturometer sold under the name TA-TX2i by the company RHEO, equipped with a stainless steel cylinder with a diameter of 2 mm moving at the measuring speed of 0.1 mm/s, and penetrating into the wax at a penetration depth of 0.3 mm.

It is in particular possible to use hydrocarbon waxes such as beeswax, lanolin wax, and Chinese insect waxes; rice wax, Carnauba wax, Candellila wax, Ouricurry wax, Alfa wax, cork fibre wax, sugar cane wax, Japanese wax and sumac wax; montan wax, microcrystalline waxes, paraffins and ozokerite; beeswax, jojoba wax, *mimosa* wax, sunflower wax, polyethylene waxes, waxes obtained by Fisher-Tropsch synthesis and waxy copolymers as well as their esters. A mixture of jojoba wax, *mimosa* wax, sunflower wax is for example marketed under the reference ACTICIRE MP by the company GATTEFOSSE. In particular, the hydrocarbon waxes can be selected from Carnauba wax, beeswax, jojoba wax, *mimosa* wax, sunflower wax, and mixtures thereof.

Mention may also be made of waxes obtained by catalytic hydrogenation of animal or vegetable oils having $C_8$-$C_{32}$ linear or branched fatty chains.

Among the latter, mention may in particular be made of hydrogenated jojoba oil, hydrogenated sunflower oil, hydrogenated castor oil, hydrogenated coconut oil and hydrogenated lanolin oil, di-(trimethylol-1,1,1 propane) tetrastearate sold under the name "HEST 2T-4S" by the company HETERENE, di-(trimethylol-1,1,1 propane) tetrabhenate sold under the name HEST 2T-4B by the company HETERENE.

It is also possible to use waxes obtained by transesterification and hydrogenation of vegetable oils, such as castor or olive oil, such as the waxes sold under the names of Phytowax ricin 16L64® and 22L73® and Phytowax Olive 18L57 by the company SOPHIM. Such waxes are described in application FR-A-2792190.

It is also possible to use silicone waxes which can advantageously be substituted polysiloxanes, preferably with a low melting point. These silicone waxes are known or can be prepared according to known methods. Among the commercial silicone waxes of this type, mention may be made in particular of those sold under the names Abilwax 9800, 9801 or 9810 (GOLDSCHMIDT), KF910 and KF7002 (SHIN ETSU), or 176-1118-3 and 176-11481 (GENERAL ELECTRIC), alkyl- or alkoxydimethicones such as the following commercial products: Abilwax 2428. 2434 and 2440 (GOLDSCHMIDT), or VP 1622 and VP 1621 (WACKER), as well as (C20-C60) alkyldimethicones, in particular (C30-C45) alkyldimethicones such as the silicone wax sold under the name SF-1642 by the company GE-Bayer Silicones.

It is also possible to use hydrocarbon waxes modified with silicone or fluorinated groups, such as, for example: siliconyl candelilla, siliconyl beeswax and Fluorobeeswax from Koster Keunen.

The waxes can also be selected from fluorinated waxes.

According to a particular embodiment, the compositions according to the invention can comprise at least one wax called a sticky wax. As sticky wax, use can be made of a C20-C40 alkyl (hydroxystearyloxy) stearate (the alkyl group comprising from 20 to 40 carbon atoms), alone or as a mixture, in particular a C20-C40 alkyl 12-(12'-hydroxystearyloxy) stearate. Such a wax is sold in particular under the names "Kester Wax K 82 P®" and "Kester Wax K 80 P®" by the company KOSTER KEUNEN.

According to a preferred embodiment, the waxes are selected from hydrocarbon waxes, preferably selected from Carnauba wax, beeswax, jojoba wax, *mimosa* wax, sunflower wax, and mixtures thereof.

Lipophilic Gelling Agents

Another type of lipophilic gelling agents consists of the copolymers of styrene and of olefins such as ethylene, propylene and/or butylene, optionally combined with silicone or hydrocarbon solvents, as described in particular in application WO 98/38981 and in U.S. Pat. No. 6,309,629. They comprise in particular the gelling agents based on block terpolymers available by the company PENRECO under the trade name VERSAGEL®. Another type of lipophilic gelling agent consists of polyamides such as those identified by the INCI name polyamide-3 and in particular the SYLVACLEAR® AF 1900V and PA 1200V polymers available by the company ARIZONA CHEMICAL as well as those identified by the INCI name "Ethylenediamine/ Hydrogenated Dimer Dilinoleate Copolymer Bis-Di-C14-18 Alkyl Amide" and available for example under the trade name SYLVACLEAR® A200V or SYLVACLEAR® A2614V by the company ARIZONA CHEMICAL. The lipophilic gelling agent may alternatively be a hydrophobic modified bentone or hectorite.

Colouring Agent

The composition according to the invention can also comprise a colouring agent selected from pigments, nacres, soluble dyes, preferably soluble in water.

According to a preferred embodiment, the colouring agent is selected from pigments and/or nacres.

The term "pigments" should be understood to mean white or coloured, inorganic or organic particles, which are insoluble in an aqueous medium, intended to colour and/or opacify the composition and/or the resulting film.

The pigments can be white or coloured, inorganic and/or organic.

The pigment can be an organic pigment. Organic pigment means any pigment which meets the definition of the Ullmann encyclopaedia in the chapter organic pigment. The organic pigment may in particular be selected from the compounds nitroso, nitro, azo, xanthene, quinoline, anthraquinone, phthalocyanine, of the metal complex type, isoindolinone, isoindoline, quinacridone, perinone, perylene, diketopyrrolopyrrole, thioindigo, dioxazine, triphenylmethane, quinophthalone, quinacridone, perinone, perylene, diketopyrrolopyrrole, thioindigo, dioxazine, triphenylmethane.

The organic pigment(s) can be selected, for example, from carmine, carbon black, aniline black, melanin, azo yellow, quinacridone, phthalocyanine blue, sorghum red, blue pigments codified in the Colour Index under the references C1 42090, 69800, 69825, 73000, 74100, 74160, the yellow pigments codified in the Colour Index under the references CI 11680, 11710, 15985, 19140, 20040, 21100, 21108, 47000, 47005, the green pigments codified in the Colour Index under the references CI 61565, 61570, 74260, the orange pigments codified in the Colour Index under the references CI11725, 15510, 45370, 71105, the red pigments codified in the Colour Index under the references CI 12085, 12120, 12370, 12420, 12490, 14700, 15525, 15580, 15620, 15630, 15800, 15850, 15865, 15880, 17200, 26100, 45380, 45410, 58000, 73360, 73915, 75470, pigments obtained by oxidative polymerisation of indole and phenolic derivatives as described in patent FR 2 679 771.

These pigments can also be in the form of composite pigments as they are described in patent EP 1 184 426. These composite pigments can be composed in particular of particles including an inorganic core covered at least partially with an organic pigment and at least one binder ensuring the attachment of the organic pigments to the core.

The pigment can also be a lacquer. Lacquer means the insolubilised dyes adsorbed on insoluble particles, the assembly thus obtained remaining insoluble when used. As examples of lacquers, mention may be made of the product known under the following name: D & C Red 7 (CI 15 850:1).

The pigment can be a mineral pigment. Mineral pigment means any pigment which meets the definition of the Ullmann encyclopaedia in the inorganic pigment chapter. Mention may be made, among the inorganic pigments useful in the present invention, the oxides of zirconium or of cerium, as well as the oxides of zinc, of iron (black, yellow or red) or of chromium, manganese violet, ultramarine blue, chromium hydrate and ferric blue, titanium dioxide, metallic powders such as aluminium powder and copper powder. The following mineral pigments can also be used: $Ta_2O_5$, $Ti_3O_5$, $Ti_2O_3$, $TiO$, $ZrO_2$ mixed with $TiCO_2$, $ZrO_2$, $Nb_2O_5$, $CeO_2$, $ZnS$.

The size of the pigment useful in the context of the present invention is generally comprised between 10 nm and 10 µm, preferably between 20 nm and 5 µm, and more preferably between 30 nm and 1 µm.

The colouring agent can also be a soluble dye, preferably water soluble.

Among the water-soluble dyes, mention may be made of cochineal carmine or the products known under the following names: D & C Red 21 (CI 45 380), D & C Orange 5 (CI 45 370), D & C Red 27 (CI 45 410), D & C Orange 10 (CI 45 425), D & C Red 3 (CI 45 430), D & C Red 4 (CI 15 510), D & C Red 33 (CI 17 200), D & C Yellow 5 (CI 19 140), D & C Yellow 6 (CI 15 985). D & C Green (CI 61 570), D & C Yellow 1 O (CI 77 002), D & C Green 3 (CI 42 053), D & C Blue 1 (CI 42 090).

The nacres can be selected from those conventionally present in make-up products, such as mica/titanium dioxide. Alternatively, they may be nacres based on mica/silica/ titanium dioxide, based on synthetic fluorphlogopite/titanium dioxide (SUNSHINE® from MAPRECOS), calcium sodium borosilicate/titanium dioxide (REFLECKS® from ENGELHARD) or calcium aluminium borosilicate/silica/ titanium dioxide (RONASTAR® from MERCK).

The composition according to the invention can comprise from 0.0001 to 30% by weight of colouring agent, preferably from 0.001 to 20% by weight, and more preferably from 0.002 to 15% by weight, relative to the total weight of the composition according to the invention.

Fillers

The composition according to the invention can also comprise at least one filler. These fillers are used in particular to modify the rheology or the texture of the composition.

The fillers can be mineral or organic of any shape, platelet, spherical or oblong, regardless of the crystallographic shape (for example sheet, cubic, hexagonal, orthorombic, etc). Mention may be made of talc, mica, silica, silica surface treated with a hydrophobic agent, kaolin, powders of polyamide (Nylon®) (Orgasol® from Atochem), poly-β-alanine and polyethylene, powders of polymers of tetrafluoroethylene (Teflon®), lauroyl-lysine, starch, boron nitride, polymeric hollow microspheres such as those of polyvinylidene chloride/acrylonitrile such as Expancel® (Nobel Industry), of copolymers of acrylic acid (Polytrap<®> from Dow Corning) and silicone resin microbeads (Tospearls® from Toshiba, for example), elastomer polyorganosiloxane particles, precipitated calcium carbonate, carbonate and magnesium hydra-carbonate, hydroxyapatite, hollow silica microspheres (Silica Beads® from Maprecos), glass or ceramic microcapsules, metallic soaps derived from organic carboxylic acids with 8 to 22 carbon atoms, preferably 12 to 18 carbon atoms, for example zinc magnesium or lithium stearate, zinc laurate, magnesium myristate.

Cosmetic Active Agent

The composition according to the invention can also comprise at least one cosmetic active agent, which can be selected from the group consisting of vitamins, antioxidants, moisturising agents, anti-pollution agents, keratolytic agents, astringents, anti-inflammatory agents, whitening agents, self-tanners and agents promoting microcirculation.

Examples of vitamins include vitamins A, B1, B2, B6, C and E and their derivatives, pantothenic acid and its derivatives, and biotin.

Examples of antioxidants include ascorbic acid and its derivatives such as ascorbyl palmitate, ascorbyl tetraisopalmitate, ascorbyl glucoside, magnesium ascorbyl phosphate, sodium ascorbyl phosphate and ascorbyl sorbate; tocopherol and its derivatives, such as tocopherol acetate, tocopherol sorbate and other tocopherol esters; BHT and BHA; esters of gallic acid, phosphoric acid, citric acid, maleic acid, malonic acid, succinic acid, fumaric acid, cephalin, hexametaphosphate, phytic acid, and plant extracts, for example of *Zingiber officinale* (Ginger) roots such as Blue *Malagasy* Ginger marketed by the company BIOLANDES, of *Chondrus crispus, Rhodiola, Thermus thermophilus*, mate leaf, oak wood, Kayu Rapet bark, sakura leaves and ylang leaves.

Examples of moisturisers include polyethylene glycol, propylene glycol, dipropylene glycol, glycerine, butylene glycol, xylitol, sorbitol, maltitol, mucopolysaccharides, such as chondroitin sulphuric acid, high or low molecular weight hyaluronic acid or alternatively hyaluronic acid potentiated by a silanol derivative such as the active agent Epidermosile marketed by the company Exymol, and mucoitinsulphuric acid; caronic acid; atelo collagen; chloresteryl-12-hydroxystearate; bile salts, a major component of NHF (natural hydration factor) such as a salt of pyrrolidone carboxylic acid and a salt of lactic acid, an amino acid analogue such as urea, cysteine and serine; short chain soluble collagen, PPG diglycerine, 2-methacryloyloxyethyl phosphorylcholine homo- and copolymers such as Lipidure HM and Lipidure PBM from NOF; allantoin; glycerine derivatives such as PEG/PPG/polybutylene Glycol-8/5/3 Glycerine from NOF sold under the trade name Wilbride®S753 or else alternatively glyceryl-polymethacrylate from Sederma sold under the trade name Lubragel®MS; trimethylglycine sold under the trade name Aminocoat® by the company Ashahi Kasei Chemicals and various plant extracts such as extracts of *Castanea sativa*, hydrolysed hazelnut proteins, polysaccharides of *Tuberosa Polyanthes*, kernel oil of *Argania spinosa* and mother-of-pearl extracts containing a conchyolin which are sold in particular by the company Maruzen (Japan) under the trade name Pearl Extract®.

Other examples of moisturisers include compounds which stimulate the expression of MT/SP1 matriptase, such as an extract of carob bean pulp, as well as agents which stimulate the expression of CERT, RNAT2 or of FN3K or FN3K RP; agents increasing the proliferation or differentiation of keratinocytes, either directly or indirectly by stimulating, for example, the production of β-endorphins, such as extracts of *Thermus thermophilus* or of *Theobroma cacao* bean shells, water-soluble extracts of corn, peptide extracts of *Voandzeia subterranea* and niacinamide; epidermal lipids and agents increasing the synthesis of epidermal lipids, either directly or by stimulating certain β-glucosidases which modulate the deglycosylation of lipid precursors such as glucosylceramide into ceramides, such as phospholipids, ceramides, lupin protein hydrolysates and derivatives of dihydrojasmonic acid.

Examples of anti-pollution agents include Moringa pterygosperma seed extract (for example Purisoft® from LSN); shea butter extract (for example Detoxyl® from Silab), a mixture of ivy extract, phytic acid, sunflower seed extract (for example Osmopur® from Sederma).

Examples of keratolytic agents include α-hydroxy acids (for example glycolic, lactic, citric, malic, mandelic, or tartaric acids) and β-hydroxy acids (for example salicylic acid), and their esters, such as C12-13 alkyl lactates, and plant extracts containing these hydroxy acids, such as extracts of *Hibiscus sabdriffa*.

Examples of astringents include extracts of witch hazel.

Examples of anti-inflammatory agents include bisabolol, allantoin, tranexamic acid, zinc oxide, sulphur oxide and its derivatives, chondroitin sulphate, glycyrrhizinic acid and its derivatives such as glycyrrhizinates.

Examples of bleaching agents include arbutin and its derivatives, ferulic acid (such as Cytovector®: water, glycol, lecithin, ferulic acid, hydroxyethylcellulose, marketed by BASF) and its derivatives, kojic acid, resorcinol, lipoic acid and its derivatives such as resveratrol diacetate monolipoate as described in patent application WO2006134282, ellagic acid, leucodopachrome and its derivatives, vitamin B3, linoleic acid and its derivatives, ceramides and their homologues, a peptide as described in patent application WO2009010356, a bioprecursor as described in patent application WO2006134282 or a tranexamate salt such as the hydrochloride salt of cetyl tranexamate, a liquorice extract (*Glycyrrhiza glabra* extract), which is sold in particular by the company Maruzen under the trade name Licorice Extract®, a whitening agent also having an antioxidant effect, such as vitamin C compounds, including ascorbate salts, ascorbyl esters of fatty acids or sorbic acid, and other ascorbic acid derivatives, for example, ascorbyl phosphates, such as magnesium ascorbyl phosphate and sodium ascorbyl phosphate, or the saccharide esters of ascorbic acid, which include, for example, ascorbyl-2-glucoside, 2-O-alpha-D-glucopyranosyl L-ascorbate, or 6-O-beta-D-galactopyranosyl L-ascorbate. An active agent of this type is sold in particular by the company DKSH under the trade name Ascorbyl Glucoside®.

An example of a self-tanner is DHA.

Examples of agents promoting microcirculation include an extract of lupin (such as Eclaline® from Silab), ruscus, horse chestnut, ivy, *ginseng* or sweet clover, caffeine, nicotinate and its derivatives, an algae extract of Corallina *officinalis* such as that marketed by CODIF; and mixtures thereof. These active agents, which are active on the skin microcirculation, can be used to prevent dulling of the complexion and/or to improve the uniformity and radiance of the complexion.

The composition according to the invention can comprise from 0.0001 to 10% by weight of cosmetic active agent, preferably from 0.001 to 5% by weight, and more preferably from 0.002 to 1% by weight, relative to the total weight of the composition according to the invention.

Additives

The composition according to the invention can comprise other ingredients as long as they do not interfere with the desired properties of the composition. These other ingredients can, for example, be conservatives, pH adjusters such as citric acid or arginine, antimicrobial agents, perfumes, sun filters, and mixtures thereof.

Preparation Method

An object of the present invention is also a method for preparing a film-forming cosmetic composition according to the invention comprising:

mixing plasticisers with water, and optionally with emulsifying and/or film-forming agents,
adding starch with stirring until a gel forms,
optionally adding a gelling agent,
optionally adding the colouring agent,
optionally adjusting the pH
optionally adding alcohol.

According to one embodiment, the mixing of the plasticisers with water, optionally with the emulsifying and/or film-forming agents, is carried out at room temperature, or at high temperature, for example at a temperature comprised between 6° and 95° C.

An object of the present invention is also a method for obtaining a peel-off film from a film-forming composition as described above, characterised in that:
a composition as described above is applied to keratin materials, in particular the skin, eyelashes, eyebrows or lips, so as to form a uniform liquid film,
said composition is left to dry for 10 seconds to 15 minutes A Make-Up Method for Keratin Materials The present invention also relates to a make-up or caring method for keratin materials, in particular the skin, the eyelashes, the eyebrows or the lips, consisting in applying to said keratin materials, in particular the skin, the eyelashes, the eyebrows or the lips, a composition according to the invention.

EXAMPLES

Example 1: Treatment Mask

A peel-off mask was prepared in the form of an aqueous gel having the composition shown in the following Table 1.

TABLE 1

| INCI Name | Content (% by weight) |
| --- | --- |
| PRE-GELATINISED PEA STARCH (LYCOAT RS 720 FROM ROQUETTE FRERES) | 23.5 |
| GLYCERINE | 5 |
| SORBITOL & WATER (70% MA) | 3.5 |
| PENTYLENE GLYCOL | 2.5 |
| XANTHAN GUM | 0.3 |
| ETHYL ALCOHOL | 2.5 |
| GLYCERINE & GLYCINE SOJA (SOYBEAN) SEED EXTRACT (LYSOFIX LIQUID ® BY KEMIN) | 1 |
| KAPPAPHYCUS ALVAREZII EXTRACT & CAESALPINIA SPINOSA FRUIT EXTRACT & WATER FILMEXEL ® BY SILAB | 0.5 |
| KAOLIN | 5 |
| DEMINERALISED WATER | QSP |
| CONSERVATIVE | 0.5 |
| CITRIC ACID | QS |

The conservative was dissolved under a deflocculator in water.
Lysofix Liquid® by Kemin was then added with moderate stirring until complete solubilisation.
LYOCAT RS720 and XANTHAN GUM were pasted into glycols, then the mixture was placed in a beaker.
It was then mixed until a gel was obtained.
KAOLIN and FILMEXEL® BY SILAB were added to the formula and mixed until completely dispersed.
Then citric acid was added in sufficient quantity to reach a pH around 5.

Finally, ethanol was added and mixed until completely homogenised.

The mask was applied to the skin of the face and allowed to dry. The composition spreads easily and evenly. The drying time is quite fast (between 5 and 15 minutes) and the film obtained is uniform, flexible and resistant. It can be easily removed by peeling.

For comparison, the composition of Table 1 was reproduced, wherein the pea starch (LYOCAT RS720) was replaced by a corn starch (Meritena from Tereos, Comparative 1) or by a waxy corn starch (Structure XL of Akzo Nobel, comparative 2). Tereos Meritena corn starch disperses in water but does not allow the formation of a peel-off film. The comparative composition 2 comprising waxy Structure XL corn starch by Akzo Nobel does not spread evenly. After drying, no film is formed.

Example 2: Eye Shadow

An eye shadow was prepared having the composition shown in the following Table 2:

TABLE 2

| INCI Name | Content (% by weight) |
| --- | --- |
| PRE-GELATINISED PEA STARCH (LYCOAT RS 720 FROM ROQUETTE FRERES) | 23.5 |
| GLYCERINE | 10 |
| SORBITOL & WATER (70% MA) | 3.5 |
| PENTYLENE GLYCOL | 2.5 |
| ETHYL ALCOHOL | 5 |
| SCLEROTIUM GUM & XANTHAN GUM (ACTIGUM VSX 20) | 0.6 |
| POLYSORBATE 20 | 0.5 |
| COLOURING AGENTS | 10 |
| DEMINERALISED WATER | QSP |
| CONSERVATIVE | 0.5 |
| L-ARGININE | 0.06 |

The eye shadow was prepared according to the following protocol:
weigh the aqueous phase comprising water, glycerine, sorbitol, pentylene glycol, conservative and polysorbate 20 and stir it in a rotor stator at 245 rpm,
add LYCOAT RS 720 with stirring, maintain stirring for 5 min at 245 rpm once the gel has formed,
add Actigum VSX 20 with stirring in a rotor stator at 245 rpm,
add the colouring agents with stirring in a rotor stator at 245 rpm,
adjust the pH by adding arginine.

Upon application, the formula slides very well on the eyelid and its deposit is thicker than commercial eye shadows. The product does not crumble, and therefore does not deposit residue under the eye (on the cheekbone). The makeup result is intense, durable over time, and the film obtained is a peel-off film, which allows easy makeup removal.

The invention claimed is:
1. A film-forming cosmetic composition comprising, in an aqueous continuous phase:
at least one legume starch having an amylose content greater than or equal to 30%,
at least two plasticisers selected from polyols, and water, wherein the polyols are present in a content ranging from 8 to 25% by weight, relative to the total weight of the composition, wherein the composition forms a peel-off film upon application and drying on keratin materials.

2. The composition according to claim 1, wherein the at least one legume starch has a Brookfield viscosity in aqueous dispersion at 25° C. at 20% dry matter comprised between 10 and 10000 mPa·s.

3. The composition according to claim 1, wherein the at least one legume starch has an amylose content comprised within a range from 30% to 45%.

4. The composition according to claim 1, wherein the at least one legume starch is selected from pea starches, chickpea starches, broad bean starches, faba bean starches, bean starches, or lentil starches.

5. The composition according to claim 1, wherein the at least one legume starch is a hydrolysed and hydroxypropylated leguminous starch.

6. The composition according to claim 1, wherein the at least one legume starch is present in a dry matter content comprised between 0.1% and 30% by weight, relative to the total weight of the composition.

7. The composition according to claim 1, wherein the polyols are selected from propylene glycol, butylene glycol, pentylene glycol, pentanediol, isoprene glycol, neopentyl glycol, glycerol, polyethylene glycols (PEG) having from 4 to 8 ethylene glycol.

8. The composition according to claim 1, wherein the composition comprises from 25 to 65% by weight of water, relative to the total weight of the composition.

9. The composition according to claim 1, further comprising a hydrophilic gelling agent selected from polysaccharides, protein derivatives, synthetic or hemi-synthetic gels of polyester type, polyacrylates or polymethacrylates and their derivatives.

10. The composition according to claim 9, wherein the hydrophilic gelling agent is selected from polysaccharides.

11. The composition according to claim 1, further comprising an emulsifying agent of HLB comprised between 8 and 20.

12. The composition according to claim 11, wherein the emulsifying agent of HLB comprised between 8 and 20 is selected from fatty acid esters and oxyethylenated and/or oxypropylenated sorbitol ethers, lysophospholipids, emulsifying waxes selected from the group consisting of self-emulsifying waxes or hydrolysed waxes, and mixtures thereof.

13. The composition according to claim 1, further comprising an additional film-forming agent other than starch, selected from shellac resin, sandarac gum, dammars, elemis, copals, cellulose polymers, polymers extracted from the fruit of *Caesalpinia spinosa* and/or from the alga *Kappaphycus alvarezii*, polymers of itaconic acid and mixtures thereof.

14. The composition according to claim 1, further comprising at least one mono-alcohol having from 1 to 5 carbon atoms.

15. The composition according to claim 1, further comprising a colouring agent selected from pigments and/or nacres.

16. The composition according to claim 1, further comprising at least one mineral filler.

17. The composition according to claim 1, further comprising a cosmetic active agent.

18. A method for preparing the composition according to claim 1, comprising:
mixing the at least two plasticisers with water, and optionally with emulsifying and/or film-forming agents,
adding the at least one legume starch with stirring until a gel forms,
optionally adding a gelling agent,
optionally adding the colouring agent,
optionally adjusting the pH, and
optionally adding alcohol.

19. The method according to claim 18, wherein the mixing of the at least two plasticisers with water, and optionally with the emulsifying and/or film-forming agents, is carried out at room temperature, or at high temperature comprised between 6° and 95° C.

20. A make-up or caring method for keratin materials of skin, eyelashes, eyebrows or lips, comprising applying to said keratin materials of the skin, the eyelashes, the eyebrows or the lips, the composition according to claim 1.

21. A method for obtaining a peel-off film from a film-forming composition, comprising:
applying the composition according to claim 1 to keratin materials of skin, eyelashes, eyebrows or lips, so as to form a uniform liquid film, and
leaving said composition to dry for 10 seconds to 15 minutes.

22. A method for forming, on keratin materials, a peel-off film, comprising applying the composition according to claim 1 to keratin materials.

23. The film-forming cosmetic composition according to claim 1, wherein the at least one legume starch has an amylose content between 30% and 75%.

24. The film-forming cosmetic composition according to claim 1, wherein the polyols are present in a content ranging from 10 to 20% by weight, relative to the total weight of the composition.

25. The film-forming composition according to claim 2, wherein the at least one legume starch has a Brookfield viscosity in aqueous dispersion at 25° C. at 20% dry matter comprised between 20 and 5000 mPa·s.

26. The film-forming composition according to claim 2, wherein the at least one legume starch has a Brookfield viscosity in aqueous dispersion at 25° C. at 20% dry matter comprised between 75 and 500 mPa·s.

27. The film-forming composition according to claim 2, wherein the at least one legume starch has a Brookfield viscosity in aqueous dispersion at 25° C. at 20% dry matter around 150 mPa·s.

28. The composition according to claim 3, wherein the at least one legume starch has an amylose content comprised within a range from 35% to 40%.

29. The composition according to claim 4, wherein the at least one legume starch is selected from pea starches.

30. The composition according to claim 4, wherein the at least one legume starch is a *Pisum sativum* starch.

31. The composition according to claim 6, wherein the at least one legume starch is present in a dry matter content comprised between 1% and 25% by weight, relative to the total weight of the composition.

32. The composition according to claim 7, wherein the polyols are glycerol and sorbitol.

33. The composition according to claim 7, wherein the polyols are in admixture with pentylene glycol.

34. The composition according to claim 8, wherein the composition comprises from 30 to 60% by weight of water, relative to the total weight of the composition.

35. The composition according to claim 10, wherein the hydrophilic gelling agent is selected from the group consisting of xanthan gum, *sclerotium* gum, and mixture thereof.

36. The composition according to claim 14, further comprising ethanol.

37. The composition according to claim 16, wherein the mineral filler is kaolin.

* * * * *